(No Model.)
S. ELLIOTT.
BALL BEARING FOR WHEELS.
No. 518,138. Patented Apr. 10, 1894.
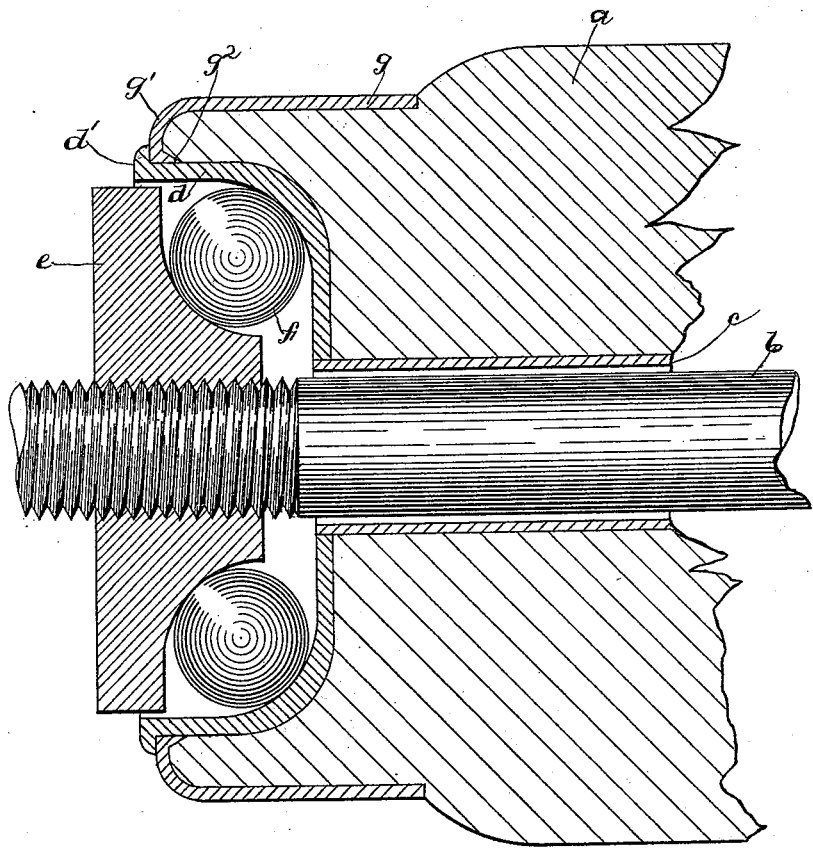
WITNESSES.
C. B. Crocker.
Lucy F. Graves.
INVENTOR.
Sterling Elliott.
by B. J. Noyes
atty.

UNITED STATES PATENT OFFICE.

STERLING ELLIOTT, OF NEWTON, ASSIGNOR TO THE HICKORY WHEEL COMPANY, OF SOUTH FRAMINGHAM, MASSACHUSETTS.

BALL-BEARING FOR WHEELS.

SPECIFICATION forming part of Letters Patent No. 518,138, dated April 10, 1894.

Application filed October 13, 1892. Serial No. 448,779. (No model.)

*To all whom it may concern:*

Be it known that I, STERLING ELLIOTT, of Newton, county of Middlesex, State of Massachusetts, have invented an Improvement in Ball-Bearings for Wheels, of which the following description, in connection with the accompanying drawing, is a specification, like letters on the drawing representing like parts.

This invention has for its object to improve the construction of ball bearings for wheels, being especially applicable to wheels having wooden hubs, said ball bearings being so constructed and arranged that the load is supported by the exterior end portions of the hub, in contra-distinction to the interior of the hub.

In accordance with this invention the wooden hub is bored axially, and has its exterior end portion turned or shaped concentric to the axis of the wheel. A metallic band is supported upon said end portion, and a cup-shaped piece is driven into or otherwise secured to or engaged by said metallic band, being thereby supported. The cup-shaped piece enters a recess formed in the end of the hub for compactness of parts and other reasons. The axle passes through the hub and cup-shaped piece, and a ball retaining cone or plate is placed thereon, preferably adjustably, and the balls are interposed between said cone and the cup-shaped piece.

To prevent the hub and spokes from becoming saturated with the oil which is used to lubricate the bearing, a thin tube is inserted in the bore in the hub, inclosing the axle, being connected with the cup-shaped piece, in an oil tight manner, such for instance as by expanding said tube into the central orifice in said piece. This tube may fit said bore or not as desired, being supported by the cup-shaped piece, and the axle is made smaller in diameter than said tube through which it passes.

The drawing shows in longitudinal vertical section one end of the hub of a wheel and ball bearing therefor embodying this invention.

The hub $a$ of wood may be supplied with spokes as usual and is bored axially, and its end portion is turned or shaped truly concentric to the axis of the wheel. A metallic band $g$ is driven or otherwise secured upon the concentric end portion of the hub $a$, having an inwardly turned flange $g'$, projecting toward the axis of the wheel and also preferably having a flange $g^2$, upon the extremity of said flange $g'$ extending inwardly parallel with the axis of the wheel. The flange $g^2$, is preferably tapered or made wedge shaped as shown. The end of the hub is recessed to receive a metallic cup-shaped piece $d$, which is provided with an outwardly projecting flange $d'$, and which is driven into or otherwise secured to or engaged by the metallic band $g$, the flange $d'$ abutting against the flange $g'$. It is immaterial whether the cup-shaped piece fits the recess in the hub, as it is supported solely by the band $g$, the engagement being herein represented as frictional, although my invention comprehends any equivalent form of connection between said parts whereby the cup-shaped piece may be engaged and supported by the band. The flange $g^2$ on the band $g$, gives additional bearing surface for the cup-shaped piece as well as assists in better securing the band $g$, to the hub. An axle $b$ passes through the hub longitudinally, and through a suitable central orifice made in the cup-shaped piece, and has supported upon it, preferably adjustably, near its end, a ball retaining cone $e$, which enters the cup-shaped piece, and co-operates therewith to hold the balls $f$, between them.

To prevent the hub and spokes from becoming saturated with oil which is used to lubricate the hub, a tube $c$ of thin material as brass for instance is inserted in the bore outside the axle, which is connected at the end with the cup-shaped piece in an oil tight manner, such for instance as by expanding said tube into the central orifice in said cup-shaped piece, yet any other form of connection may be employed. The tube does not necessarily fit the bore as it is supported by the cup-shaped piece.

It will be seen that the load is supported by the metallic band $g$, secured upon the exterior end portion of the hub, which being formed truly concentric to the axis of the wheel provides a proper as well as an efficient support for it, and as the cup-shaped piece is contained within the band $g$, the load is brought directly upon said band.

In Patent No. 491,938, dated February 14, 1893, a ball bearing is shown comprising a cup-shaped piece supported by a metallic band mounted upon the exterior of the hub, and a ball-retaining cone is secured onto the axle holding the balls in proper position between the cone and cup-shaped piece, but the curved bearing surface of said cup-shaped piece, and ball-retaining cone were therein each cut away, beginning at points where the balls ceased to contact with said surfaces, which constituted the essential feature of that invention.

I claim—

1. The combination of a wooden hub having its exterior end portion shaped concentric with the axis of the wheel, a metallic band inclosing said end portion, and a cup-shaped piece engaged and supported by said band, an axle passing through said hub and cup-shaped piece, a ball retaining cone thereon, and balls interposed between said ball retaining cone and cup-shaped piece, substantially as described.

2. The combination of a wooden hub bored axially and having a recessed end, the exterior end portion of said hub being turned concentric with the axis of the wheel, a metallic band fitted onto said end portion, and a ball receiving cup contained in the recess and engaged and supported by said band, the axle passing through said hub and cup-shaped piece, ball retaining cone thereon, and balls interposed between said ball retaining cone and cup-shaped piece, substantially as described.

3. The combination of a wooden hub bored axially and having its exterior end portion shaped concentric with the axis of the wheel, a metallic band upon said end portion, a cup-shaped piece engaged and supported by said band, said parts when in engagement entirely concealing and protecting the end of the hub, a metallic tube passing through said bore and connected with said cup-shaped piece by an oil tight joint, an axle passing through said tube and cup-shaped piece, ball retaining cone thereon, and balls, substantially as described.

4. The combination of a wooden hub bored axially and having its exterior end portion shaped concentric with the axis of the wheel, a metallic band upon said end portion having an inwardly turned flange $g'$, a cup-shaped end piece engaged and supported by said band having an outwardly extended flange $d'$, which abuts against the flange $g'$, of the band, an axle passing through said hub and cup-shaped piece, ball retaining cones thereon, and balls, substantially as described.

5. The combination of a wooden hub bored axially and having its exterior end portion shaped concentric with the axis of the wheel, a metallic band upon said end portion having an inwardly turned flange $g'$, and a flange $g^2$, a cup-shaped end piece engaged and supported by said band having an outwardly extended flange $d'$, which abuts against the flange $g'$ of the band, an axle passing through said hub and cup-shaped piece, ball retaining cone thereon, and balls, substantially as described.

In testimony whereof I have signed my name to this specification in the presence of two subscribing witnesses.

STERLING ELLIOTT.

Witnesses:
BERNICE J. NOYES,
LUCY F. GRAVES.